Patented Oct. 28, 1930

1,779,900

UNITED STATES PATENT OFFICE

FRANK W. BRINTNALL, OF DETROIT, MICHIGAN, ASSIGNOR, BY MESNE ASSIGNMENTS, TO NATIONAL AUTOMOTIVE FIBRES, INC., OF WILMINGTON, DELAWARE, A CORPORATION OF DELAWARE

UPHOLSTERY-FORMING MACHINE

Application filed December 5, 1927. Serial No. 237,785.

This invention relates to a machine for forming upholstery and more particularly to a machine for making what is known to the trade as tubular upholstery wherein parallel padded portions extend longitudinally of the strips or widths of the goods forming the facing and lining materials, with straight seams between these padded portions.

An object of the invention is to provide a machine for forming such upholstery in continuous strips from widths of material which may be in roll form, by sewing along parallel lines and simultaneously feeding padding material into the fabric tubes thus formed.

A further object is to secure accuracy in work formation and positive feeding of the material through the machine, to which ends means is provided for ingathering the lining and facing material and positively and accurately forming the same into seams along parallel lines, and means is provided for securely holding and feeding the material along the edges thereof and for engaging the material throughout an entire surface thereof to provide an even, positive feed of the formed material while being sewed, means being also provided for accurately guiding strips of padding material into place between the facing and lining materials as they are fed through the machine.

It is also an object to provide certain other new and useful features in the construction and arrangement, all as hereinafter more fully set forth.

With the above and other ends in view, the invention consists in the matters hereinafter set forth and more particularly pointed out in the appended claims, reference being had to the accompanying drawings, in which

Figures 11, 12, 13:
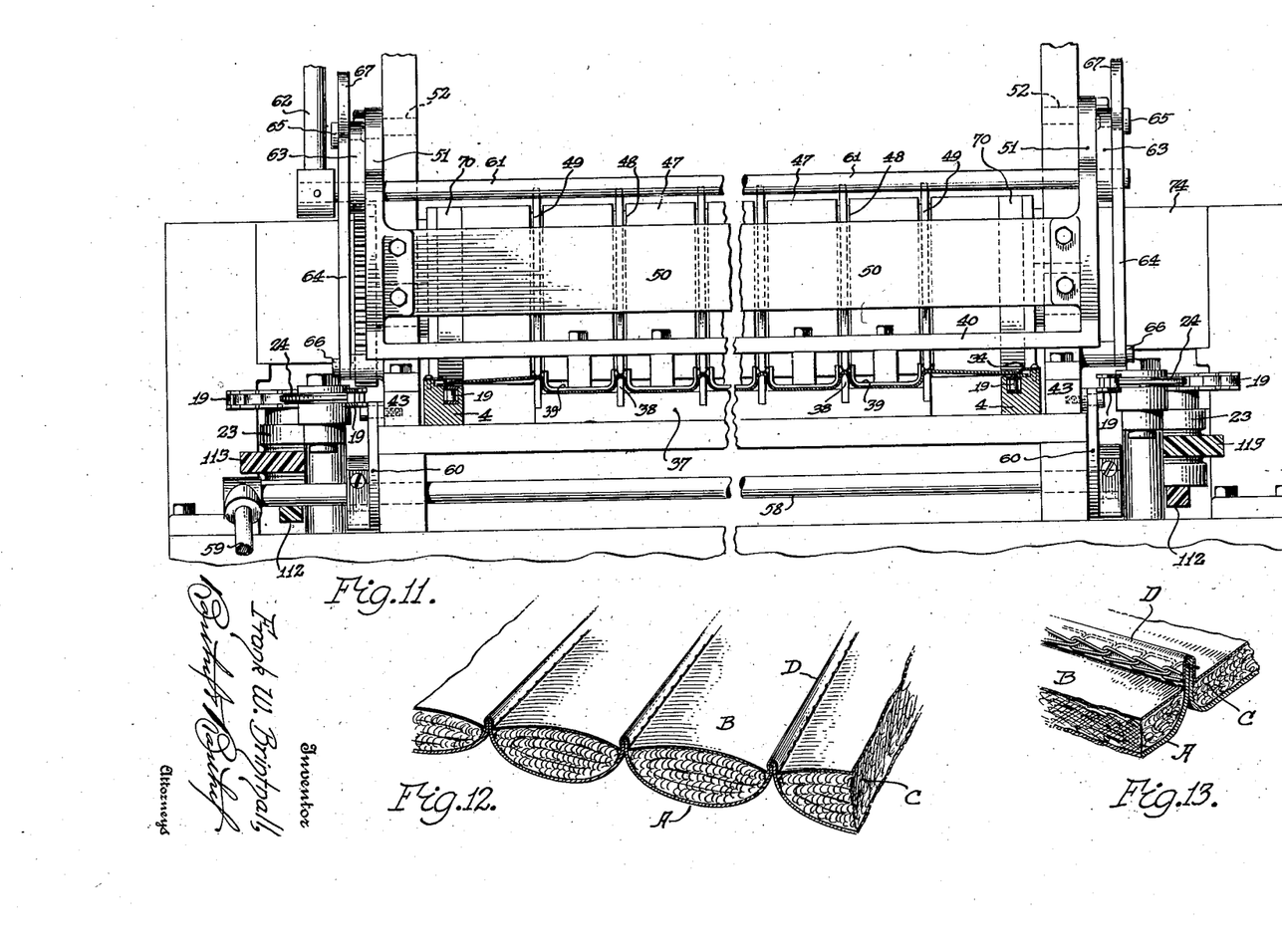
Fig. 11 is a rear end elevation of Fig. 7 with parts in section and parts broken away to decrease the dimensions of the figure.
Fig. 12 is a sectional perspective view of a portion of finished upholstery.
Fig. 13 is a perspective detail showing the upholstery seam and stitching.

The upholstery formed and sewed by the machine embodying the present invention, is illustrated in Figs. 12 and 13 of the accompanying drawings, said upholstery comprising a covering or surface fabric A, an inner or lining material B, and strips of filling or stuffing material C, said filling strips being separated by longitudinal parallel seams D formed by bringing the facing and lining material together in an outstanding fabric rib and then sewing through this rib. The padded portions thus formed, extend longitudinally of the widths or strips of material, and it is desirable that the fabric lining and covering material be automatically conveyed to and through the machine to form upholstery strips of any desired length and so that the fabric may be supplied from rolls of the material if desired.

In forming the upholstery with longitudinally extending padded portions with seams between these portions from widths of facing and lining materials, it is necessary to provide for the take-up in width of the material in the forming of these seams and also in forming the tubes, the facing material being of greater width between the seams than the lining material to provide a fabric tube for receiving the padding material. Where the lining and facing materials are taken from rolls of these materials it is necessary that each width of material be guided and held at its edges in entering the machine and as the tubes and seams are formed, provision must be made for an ingathering or inward movement of the edges of materials while so held and it is also necessary that a positive even feeding of the material through the machine be provided for in order that the seams may be accurately formed and the fabric held taut and smooth to prevent distortion or wrinkling.

In the accompanying drawings a machine illustrative of an embodiment of the present invention is shown, said machine as shown being adapted to automatically feed the different materials for forming the upholstery, directly from rolls of these different materials, but it will be understood that shorter lengths of such materials may be formed into upholstery by the use of a machine embodying the pertinent features of the present invention.

In the accompanying drawings, the machine as illustrated comprises a suitable supporting frame 1 having cross members 2 supporting a horizontally disposed bed plate 3 and grooved side rails 4 (see Figs. 4, 5, 10, 11 and 15) extending substantially throughout the length of the machine at each side thereof and directly beneath the edges of the facing material A as it passes through the machine. Mounted in suitable bearings upon the frame 1 is a pair of transverse shafts 5 and 6 and also a forward transverse shaft 7, all of said shafts being provided with sprocket wheels 8 over which endless feed chains pass, the sprocket wheels on the shafts 5 and 6 carrying a series of feed ridge chains indicated as a whole by the numeral 9 and the sprocket wheels on the shafts 6 and 7 carrying a series of feed pleat-supporting chains 10. Each chain comprises a series of pivotally connected links 11 notched at one side to receive the teeth of the sprocket wheels and corrugated or roughened at the opposite side, as at 12, to engage the facing material and feed the work through the machine. The chains 10 are made up of a great number of links in the width of the chain to provide a broad chain surface of a width substantially equal to the width of the upholstery between the several seams, and the chains 9 are of a lesser width, being of substantially the width of each seam and substantially filling the spaces between the wider chains 10. Each chain 9 as shown more clearly in detail in Fig. 16, has two series of parallel spaced-apart outstanding blades 13, each blade being formed integral with a link of the chain, and roughened or corrugated at its free edge to engage and feed the fabric forward, the two series of upstanding blades being adapted to project upwardly within the fabric rib or seam while such rib is being formed and to positively engage the fabric within the upstanding rib and feed the same forwardly to the point or place of sewing the rib transversely, the sewing mechanism hereinafter described being located adjacent and just forwardly of the vertical plane of the shaft 5, so that these chains 9 in passing around the sprockets on said shaft will be withdrawn from engagement with the fabric just prior to the sewing operation, the blades 13 carried by these chains being also withdrawn from the formed-up fabric ribs just before they reach the place where the ribs are sewed. All of the chains are firmly supported in a horizontal plane by the plate or table 3 over which they pass in contact with the upper surface thereof, said plate extending from adjacent the sprockets on the shaft 6 to adjacent the sprockets on the shaft 5.

Figures 1, 2, 3:
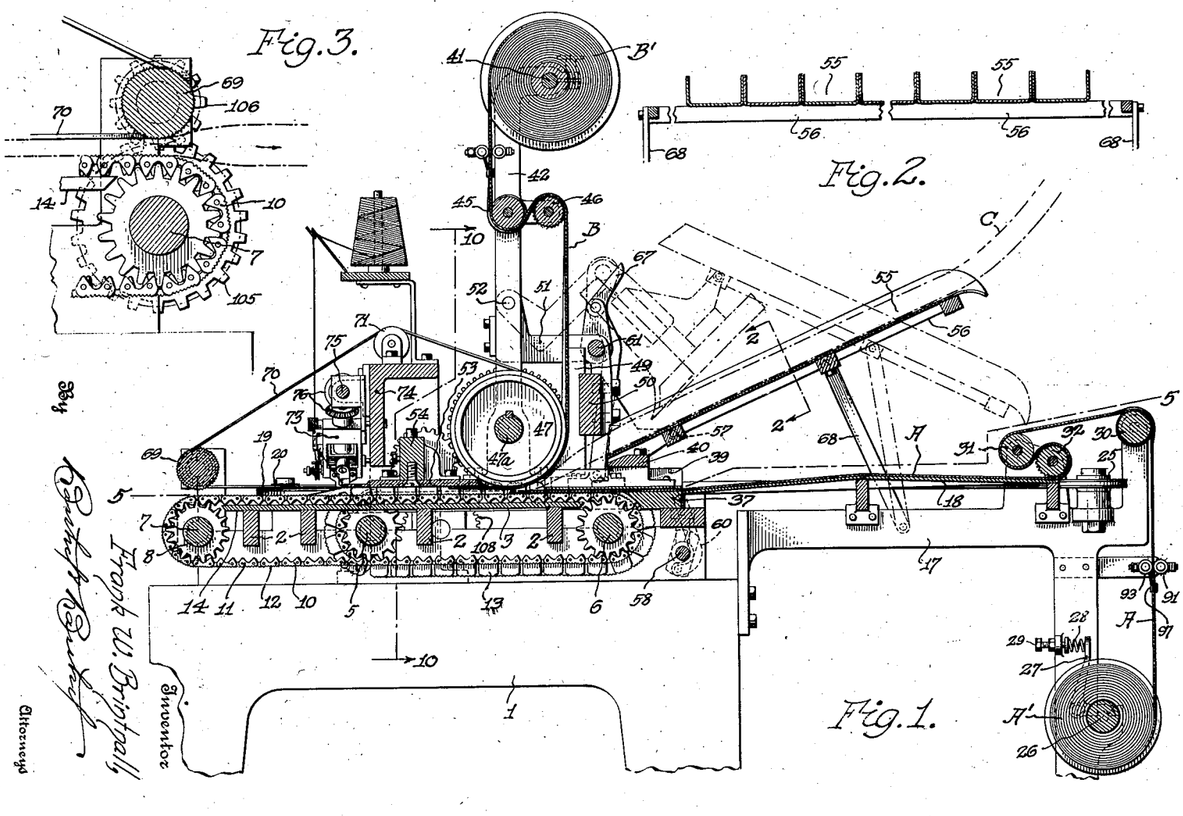
Figure 1 is a vertical longitudinal section substantially upon the line 1—1 of Fig. 4, through a machine illustrative of an embodiment of the invention.
Fig. 2 is a sectional detail upon the line 2—2 of Fig. 1.
Fig. 3 is a sectional detail substantially upon the line 3—3 of Fig. 4.
Figure 4:
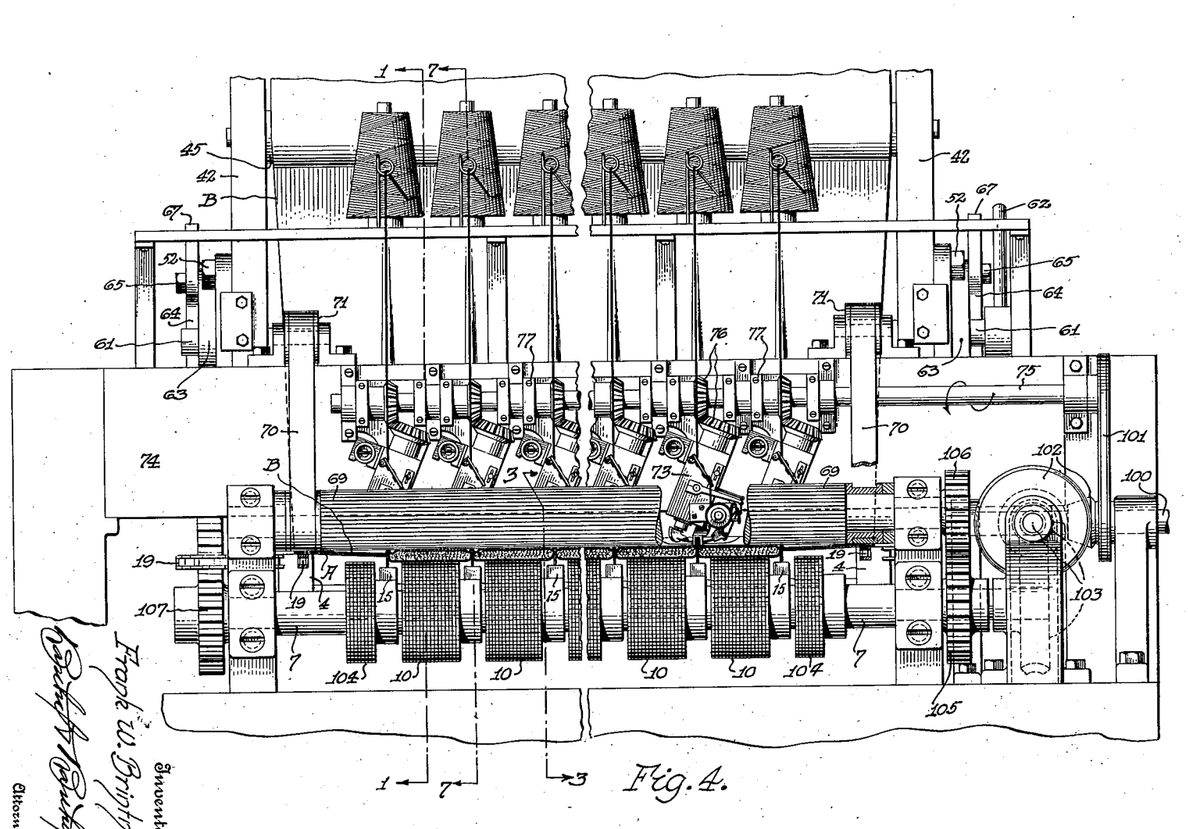
Fig. 4 is a front end elevation of the machine with portions broken away and in section.

The wide chains 10 extend to the extreme forward end of the machine and the upper runs of these chains are supported in a horizontal plane by a series of plates 14 (Figs. 1 and 7) carried by the cross members 2, which plates form extensions of the table 3 in the horizontal plane thereof and extend to adjacent the sprocket wheels on the shaft 7. Bars 15 of greater width vertically than the thickness of the plates 14 are secured to the cross members 2 between the chains 10 and secured to each of these bars 15 is a blade or fin 16 which extends rearwardly over the shaft 5 and chains 9 between the longitudinal rows of blades 13 on each of these chains, the purpose of which blade, or fin is hereafter more fully set forth.

Secured to and extending rearwardly from the frame 1, is a supplemental supporting frame 17 (see Figs. 1 and 5) upon which is secured a thin metal table 18 and the side rails 4 are extended rearwardly along the edges of this table 18 to the extreme rear end of the machine. Each rail 4 has a longitudinal groove in its upper side to receive a run of a continuous drag chain 19 which moves freely in this groove and is guided thereby, there being one of these drag chains at each side of the machine and the width of the table being of a width corresponding to the width of the facing fabric A so that these drag chains in passing along the grooves in the rails may engage the fabric along the edges thereof and feed the same forwardly. Forwardly of the transverse shaft 5, each of these drag chains 19 passes out of the end of the groove in its guide rail and over a sprocket wheel 20 mounted upon a suitable vertical stud on the machine frame.

From the sprocket 20 the chain passes rearwardly over a driving sprocket 21 mounted upon a short vertical shaft 22 carried by a suitable bracket 23 secured to the frame and from the driving sprockets 21 the chains pass over idlers 24 also mounted upon the brackets 23 and thence extend rearwardly to the extreme rear end of the machine where they pass around idler sprockets 25 and thence into the rear ends of the grooves in the rails 4. These rails, along the edges of the table, diverge rearwardly and thus the width of the table at its rear end is greater than its width where it joins the machine frame, the distance between the drag chains at the rear end of the table being substantially equal to the width of the fabric covering A, or the over all length of the fabric roll A' from which this fabric is drawn.

The fabric A in roll form A' is supported upon a shaft 26 mounted within open bearings on the legs of the frame 17 at the extreme rear end of the machine and below the plane of the table 18. Bell crank members 27 are pivoted to the legs with one arm of each bell crank engaging over the shaft 26 to hold the same in its open bearings, and a spring 28 engages the other arm of each bell crank to turn the cranks upon their pivotal support and hold the same in engagement with the ends of the roll shaft 26 to put a friction thereon and thus retard the rotation of the roll and the withdrawal of the fabric therefrom, means, such as adjusting screws 29 being provided to regulate the tension of the springs 28 and thus govern the amount of pull required to unwind the fabric from the roll A'. From the roll A', the fabric A passes vertically to a spreader roll 30 (Figs. 1 and 5) and over this roll to an idler roll 31 extending transversely of the table 18 just forwardly of its rear edge and spaced therefrom. The fabric passes around the roll 31 and thence over a second spreader roll 32, and thence onto the table 18. The spreader roll 30 is provided upon its outer surface with a spirally arranged thread or rib 33, said rib extending from a central point intermediate the ends of the roll toward each end of the roll with the spiral at one end extending in a direction spirally opposite to that at the other end so that the fabric in passing over this roll will be slightly stretched to smooth out the wrinkles in the fabric, such smoothing out action or stretching being applied to the fabric from the central portion thereof toward each edge.

The roll 32 is formed to act upon the fabric A in a manner similar to that of the roll 30, said roll 32 being formed with external screw-threads extending in each direction toward the ends of the roll from the central portion of the roll, and these threads are preferably divided or cut transversely by longitudinal grooves in the surface of the roll, thus providing a roughened roller surface in the form of a great number of small projections arranged spirally about the roll. The material A is therefore smoothed out and stretched slightly in width before it reaches the rear end of the table 18, thus eliminating all wrinkles. The edges of the fabric at the rear end of the table engage over the drag chains 19 and these edges are held in contact with the chains by means of plates 34 adjustably secured to the rails 4 and extending inwardly over the chains, with their inner edges bent downwardly, as at 35 (see Fig. 15). The pivot pins 36 of each chain 19 project upwardly a short distance, forming studs or projections to engage the fabric A and thus feed the fabric forwardly, the edge portions of the fabric being engaged adjacent these studs 36 by the downbent edges 35 of the plates 34, thus putting a sharp bend or kink in the fabric adjacent each edge so that the fabric will not be readily pulled out from engagement with the feed chains 19. As the rails 4 along the edges of the table 18 converge forwardly the fabric is ingathered or provided with a fullness as it approaches the fabric rib or seam forming means hereinafter described.

Extending transversely of the frame 1 and supported thereby at the forward edge of the table 18, is a bar 37 (see Figs. 1, 5, 7 and 11) provided with spaced-apart upstanding ribs 38, the spacing of these ribs being equal to the desired spacing of the seams to be formed in the upholstery and as the fabric A is carried forward by the drag chains 19, this fabric passes over the ribs 38, thus forming the fabric upwardly along parallel lines, as clearly shown in Fig. 11, and to form this fabric down between the ribs and take out the slack, a series of trough-like forming members 39 are secured in spaced-apart relation, to a transverse bar 40 of a suitable supporting frame hereinafter more fully described, said forming members 39 being accurately positioned between the ribs 38 and also between the ridge-chains 9 and in spaced relation to said ribs and to the bar 37 so that the material A may pass freely between the members and bar and over the ribs and ridge-chains, thus forming a series of upstanding fabric ribs, or seam-ridges, at intervals throughout the width of the material. The ribs 38 extend forwardly and over the ridge chains 9 for a short distance, said ribs being in longitudinal alinement with the upstanding blades or plates 13 on said chains and the upper edges of the ribs being in the horizontal plane of the upper corrugated edges of said plates. The forming members 39 between the ribs 38 extend forwardly over the chains 9 between the upstanding plates 13 of these chains and thus as the fabric leaves the forward ends of the ribs 38 it is engaged by the plates 13 on the chains which then take the place of the ribs in providing an inner form over which the fabric is formed, and these plates on the chain engaging within the fabric groove thus formed, serve to feed the fabric evenly along the several lines of the several seams or upstanding ribs of the upholstery.

Figure 5:
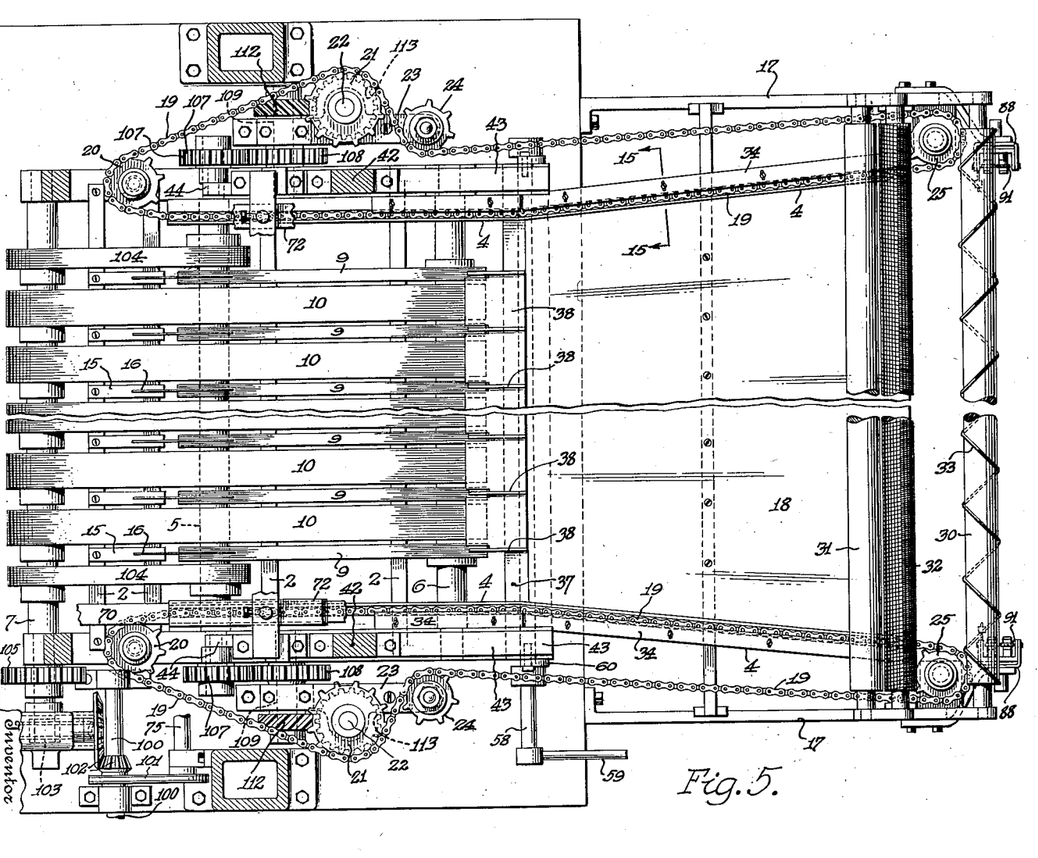
Fig. 5 is a sectional plan view, substantially upon the line 5—5 of Fig. 1.
Figure 6:
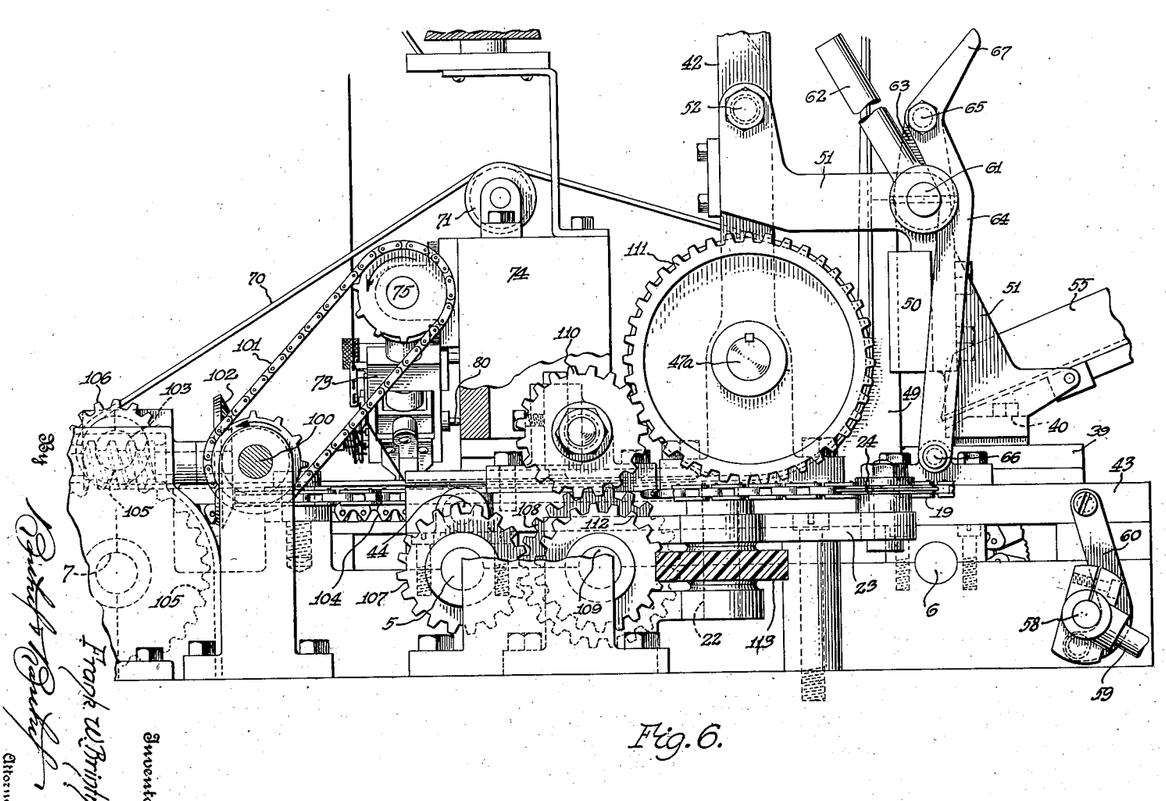
Fig. 6 is an enlarged side elevation of the main portion of the machine with parts broken away to more clearly disclose the construction.

The lining material B in roll form B' is mounted upon a shaft 41 carried in bearings upon the upper ends of standards 42 (see Figs. 1, 4, 5, 6, 10 and 11) which standards are rigidly secured at their lower ends to supporting frame members or bars 43 extending longitudinally of and supported upon the longitudinal rails or side members of the frame 1, said bars 43 being pivoted at their forward ends to the frame, as at 44 (see Figs. 5 and 6). The fabric B is drawn from the roll B', extending downwardly from the roll and around an idler 45 corresponding to the idler 31 and thence over a spreading and straightening roll 46 corresponding in construction to the roll 32. From the roll 46 the fabric extends downwardly to the periphery of a drum 47 comprising a series of wheels or pulleys placed end to end in contact with each other and in fixed relation upon a shaft 47ª which is mounted at its ends in bearings upon the standards 42. Each section or wheel of the drum 47 has a plain wide surface of substantially a width equal to the width between the formed up fabric ribs or seams and also each section is formed with an end groove 48 (see Figs. 7, 10 and 11) of a depth to receive the upstanding fabric rib. The fabric B is ingathered or narrowed in width as it approaches the drum 47 to provide a slack in the material to form the longitudinal fabric ribs, or seam-ridges, therein, said forming of the fabric being accomplished by means of a series of shoes 49 (see Figs. 1, 6, 7 and 11) rigidly secured to a cross bar 50 on a frame 51 which is pivoted at 52 to the standards 42. This frame 51 carries at its lower end the cross bar 40 to which the forming members 39 are secured and therefore when the frame 51 is swung upon its pivot 52 the forming members 39 and the forming shoes 49 are swung upwardly and out of operative position. There is a forming shoe 49 for each of the grooves 48 in the drum and therefore when these shoes are swung toward the drum they enter the grooves and press the fabric B into the grooves of the drum to partially form the outstanding ribs on the fabric and take up the slack transversely of the width of the goods. The lower ends of the shoes 49 are curved to conform to the curvature of the drum and thus direct the fabric beneath the drum and hold it within the grooves.

As the facing material A and lining material B are fed forward beneath the drum 47, the fabric tubes to receive the filling material C are formed between the wide flate surfaces of the drum between the grooves, and the upper surfaces of the several wide chains 10 as the formed fabric A passes from beneath the formers 39 which serve to depress the fabric between the upstanding ribs 38. Forwardly of the drum 47 the fabric lining B passes beneath a series of plates 53 (see Figs. 1, 7 and 10) secured to the underside of a cross bar 54 extending across the frame, each of said plates being of a width substantially equal to the width of the plane surfaces of the drum and thus these plates form a backing for or provide a surface beneath which the fabric B passes in leaving the drum and these longitudinal portions of the fabric passing beneath these plates and held in firm contact therewith form the upper walls of the fabric tubes to receive the filling material C, the lower wall of each of such tubes being formed by the portions of the material A which has been depressed by the forming members 39. These fabric tubes thus formed and extending beneath the plates 53, are separated from each other at this point of their travel by the upstanding parallel rows of plates 13 on the feed chains 9, said plates extending upward into the grooves 48 in the drum and also into the spaces between the adjacent edges of the plates 53 with the covering and lining material stretched thereover and pressed thereby upwardly into said grooves and spaces, thus maintaining the fabric rib formation between the fabric tubes.

The filling C for the fabric tubes may be of cotton or other suitable material and may be formed in continuous strips of a proper width and size to fill the fabric tubes of the upholstery. These strips of filling material may be wound into a roll (not shown) if found desirable, and drawn from such roll or other source of supply into the upper rear ends of a series of inclined troughs 55, said troughs being supported by a suitable frame 56 which is pivotally attached at 57 near its lower end to the frame 51, with the lower open ends of the troughs adjacent the rear edges of the forming shoes 49 and above the cross bar 40 which carries the formers 39, these formers 39 being also of trough-shape so that they may receive at their forward ends, the filling material as it passes from the forward ends of the troughs 55 and into the several fabric tubes just as these tubes are formed up by the drawing of the lining and covering material beneath the drum 47. These strips of filling material are compressed slightly as they enter the fabric tubes and thus completely fill the tubes and space the walls of the tubes apart as the fabric passes beneath the drum and plates 53. The positive feeding of the fabric and lining materials forwardly by means of the plates 13 on the feed chains 9 which engage within the fabric ribs between the fabric tubes, will also feed the strips of filling material into the tubes, due to this compressing of the filling material within the fabric tubes as these tubes are formed between the several chains and the rotating drum.

In order to facilitate the starting of the facing and lining materials through the machine, it is desirable to have the drum so mounted that it may be lifted or moved upwardly to a limited extent together with the several plates 53 so that the end of the lining material B may be passed downwardly beneath the drum and plates and the intermediate portions of the material pressed or formed to an extent into the drum grooves, and also so that the facing material A may be passed over the ribs 39 and chain plates 13 to a point beneath or forwardly of the drum so that these end portions of material will be caught by the feed chains to start the material through the machine. It is also desirable, in order to assist in the placing and initial forming of the facing and lining materials, that the forming shoes 49 be withdrawable from the grooves in the drum and the forming members 39 lifted out of operative position so that the covering material may be placed therebeneath. The standards 42 and cross bar 54 which carry the plates 53 are therefore secured to the side bars 43 which are pivoted at their forward ends to the frame forwardly of the drum 47. By lifting the rear ends of these side bars 43, the entire mechanism carried by these bars is swung upwardly, thus moving the plates 53 and drum 47 away from the feed chains a short distance. To facilitate the lifting of the rear ends of these bars 43, a shaft 58 extends transversely of the supporting frame and is provided with an operating handle 59 at one end by means of which the shaft may be turned. Links 60 are pivotally attached at their upper ends to the bars 43 and at their lower ends are connected to the shaft 58 eccentrically of the shaft so that when the shaft is turned the links will be lifted and thus lift the side bars 43.

To provide for the moving of the forming shoes 49 and forming members 39 out of operative position as well as to raise the troughs 55 and give free access to the drum for the insertion of the fabric covering and lining material, the frame 51 which carries these instrumentalities is pivoted at 52 to the standards 42 so that it may be swung rearwardly and upwardly and in so doing carry the forward end of the troughs 55 which are pivotally attached thereto into an elevated position. To facilitate the swinging of this frame a shaft 61 is mounted in bearings in the frame 51 and is provided with an operating handle 62 at one end. On this shaft are crank arms 63 pinned or otherwise rigidly attached to the shaft and link bars 64 are pivotally attached near their upper ends to these crank arms, as at 65, said link bars being pivotally supported at 66 upon suitable supports rigidly secured to the side bars 43. Turning the shaft by its handle 62 first swings the link bars 64 rearwardly and when they have moved a short distance the pivots 65 then become the fulcrum upon which the cranks 63 turn and further turning of these cranks by means of the shaft 61 will lift the shaft and frame 51 upwardly, the shaft describing a path about the pivot 65 until this movement of the shaft is stopped by its coming into contact with an extended end portion 67 on each of the link bars 64. The frame is thus swung upwardly upon its pivots 52 to the position shown in dot and dash lines in Fig. 1, carrying the shoes 49 and formers 39 upwardly and rearwardly away from the drum 47 and at the same time swinging the trough 55 upwardly, said trough being normally supported in an inclined position by means of links 68 pivotally attached at their lower ends to the frame 17 and at their upper ends to the trough frame 56.

To assist in feeding the finished upholstery from the machine, a roughened feed roll 69 is mounted in suitable bearings upon the machine frame vertically above the shaft 7 and in spaced relation to the several feed chains 10 to engage the upper surface of the work at the extreme forward end of the machine and feed the work out of the machine by means thereof and by the engagement of the feed chains with the lower surface of the work. To further assist in the feeding of the material through the machine, feed belts 70 pass around the roll 69 at the ends thereof with their straight horizonal runs lying parallel with the longitudinal feeding runs of the chains 19 to hold the edges of the fabric down upon these chains 19 after the fabric passes from beneath the plates 34, so that the edges of the fabric will be held in firm engagement with the upwardly projecting studs 36 on the chains 19, said belts passing around the drum 47 within grooves in the end members of the drum to receive said belt, and then over an idler 71 to hold each belt tight. To hold the horizontal runs of these belts down upon the chains forwardly of the feed roll 47, a foot or shoe 72 (see Figs. 5 and 10) is provided to engage the upper surface of this run of each belt, these shoes being carried by the cross bar 54, as clearly shown in Fig. 10.

The several seams D of the finished upholstery are simultaneously sewed by means of a plurality of sewing heads (see Figs. 1, 4, 7, 19, 20 and 21) each indicated as a whole by the numeral 73, a head being provided for sewing each seam, and the several heads being supported by a transverse bridge bar 74 which spans the machine frame and is secured at its ends to the sides of the frame in such a position that the sewing instrumentalities carried by each head will be positioned just forwardly of the shaft 5 and where the chains 9 begin to turn around said shaft. The construction of each of these several heads and the operation of the sewing instrumentalities is fully set forth in an application filed by me July 2, 1927, under Serial Number 203,231, and therefore these sewing heads do not, in their specific construction, form a part of this present invention and application.

That the sewing operation performed by each of these heads may be understood in connection with the present application, it is deemed sufficient to describe in a general way only, the construction and operation of each head.

A drive shaft 75 is mounted in brackets upon the bridge bar 74 near the upper side thereof and extends longitudinally of the bar adjacent its forward face. The several heads receive motion from this shaft, each through a pair of beveled gears 76 and the body or frame of the head is pivotally supported upon the shaft 75 by means of bearings 77 engaging the shaft and carried by the body or frame of the head. Each head as a whole, is therefore free to swing forwardly and rearwardly upon the shaft and this swinging movement is utilized to permit the head to swing forwardly with the travel of the work while the needle is engaged with the upstanding seam of the work.

A drive shaft 78 is mounted in bearings in the frame of the head and within the frame on the shaft is a cam 79 which engages a push pin 80 projected by the cam into engagement with the forward face of the bridge bar 74. On the lower end of the shaft 78 is a looper 81 and on the shaft within the frame is a cam member 82 for operating a swinging needle bar 83 carrying at its lower end a needle 84 which is curved in the direction of its length concentric with the axis of the swinging movement of the bar. Suitable thread tensioning and feeding mechanism is mounted on the head and parts thereof are operated in timed relation to the swinging of the needle bar and the rotation of the looper by motion imparted thereto from the shaft 78.

With this arrangement of sewing heads the work may be fed through the machine with a continuous movement and the sewing of the seam will be performed during this travel of the work, the several heads being swung forwardly with the travel of the work during the time that the needle is in engagement with each upstanding seam. The needle bar carried by each head is arranged to swing in the arc of a circle and the needle carried thereby is curved to conform to this arc so that the needle may pierce the upstanding fabric rib of each seam close to the body of the work, the needle piercing the rib within a notch or undercut 85 in the fin 16 which fin is fixedly supported to extend between the two rows of the upstanding plates 13 on the feed chains 9 so that as the formed fabric rib is disengaged by these plates 13 and they are withdrawn therefrom by the turning of the chains 9 about the shaft 5, this fin will engage within the fabric rib and an inclined edge portion 86 thereof will raise the fabric and take out the slack as the sides of the fabric rib come together or come into contact with the sides of the fin as the feed plates 13 are withdrawn from the fabric rib. Immediately upon the bringing together of the sides of the fabric rib, the sewing operation begins, the needle piercing the rib within the notch 85 of the fin. By providing a series of sewing heads, any number of fabric seams may be sewed by increasing the number of heads or removing some of them, and the distance between the seams may be varied according to the construction of the machine by varying the spacing of the heads. The construction of the head and the manner of driving the sewing instrumentalities is such that very little space is taken up by each head and therefore the seams may be closely spaced.

Figures 14, 15, 16, 17, 18:
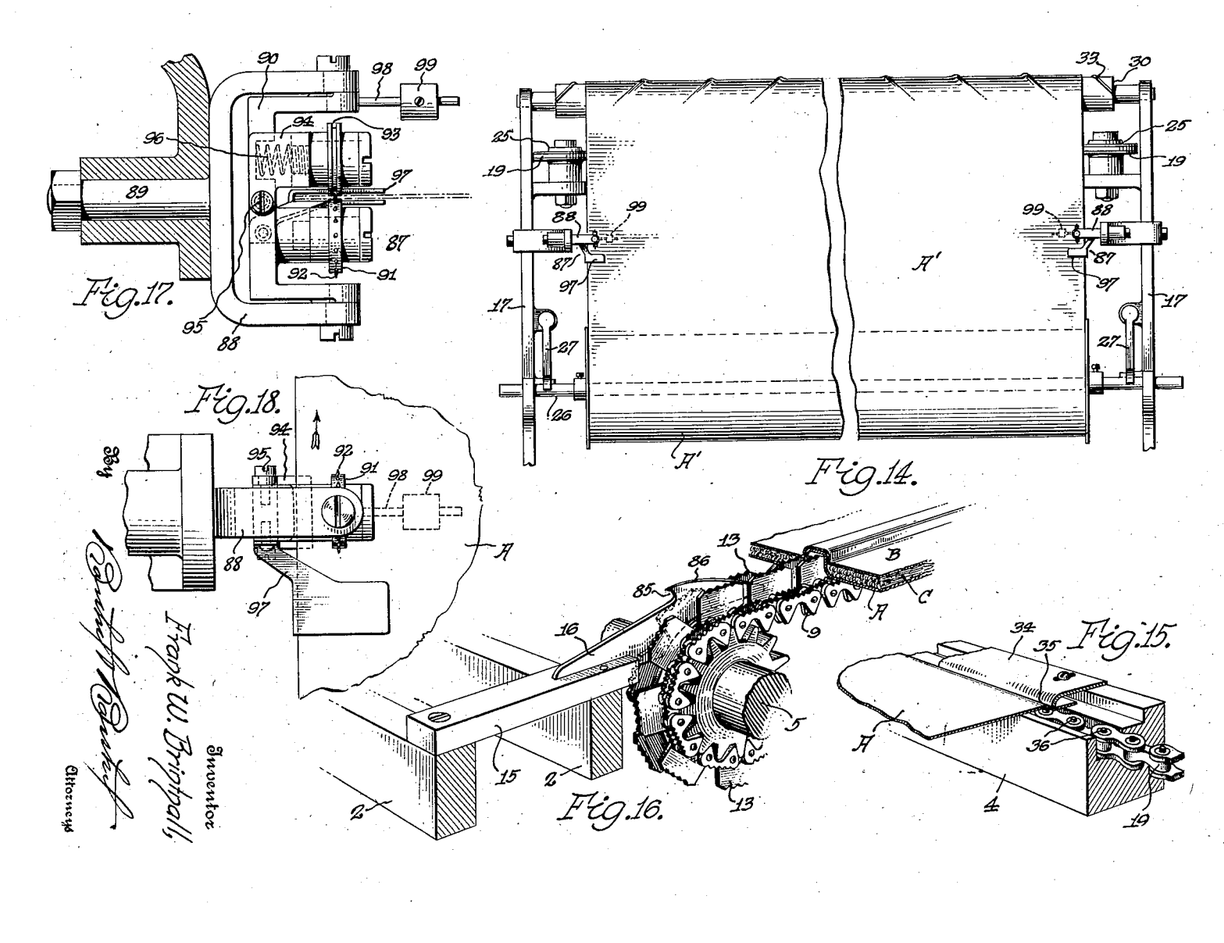
Fig. 14 is a rear elevation of the roll of covering material and run of fabric leading therefrom shown in Fig. 1, and illustrating the holding, guiding and spreading means for the fabric.
Fig. 15 is a perspective sectional detail substantially upon the line 15—15 of Fig. 5, of the fabric edge feeding and holding means.
Fig. 16 is a perspective detail of the forward end of the run of one of the seam forming and feeding chains and adjacent machine parts.
Fig. 17 is an enlarged detail showing in plan view the fabric edge guiding and holding device shown in elevation in Fig. 14.
Fig. 18 is a front elevation of Fig. 17.
Figure 19:
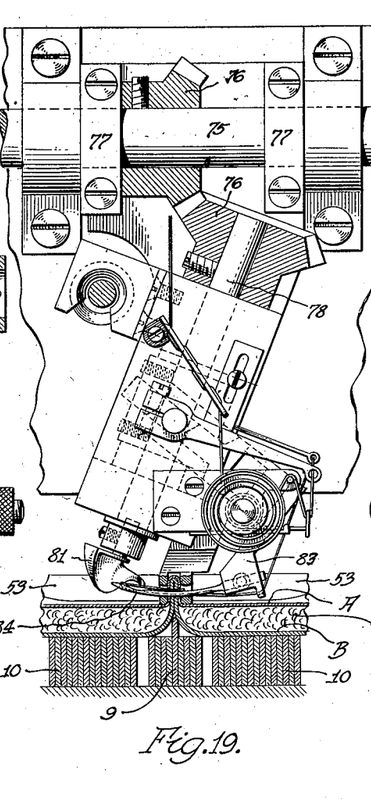
Fig. 19 is a detailed front elevation of a sewing head illustrating the operation thereof in sewing a seam.
Figure 20:
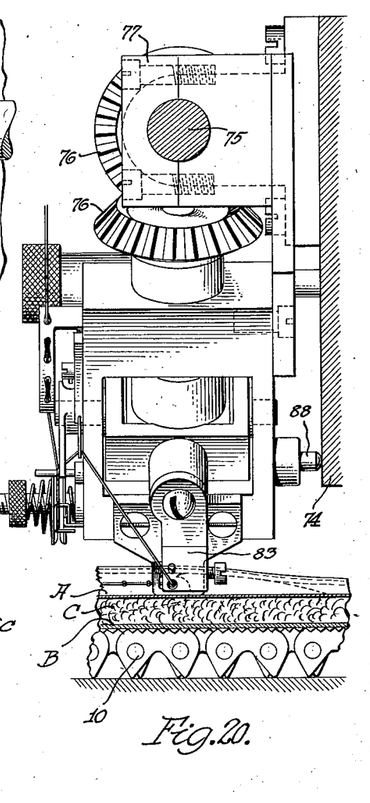
Fig. 20 is a right side elevation of Fig. 19.
Figure 21:
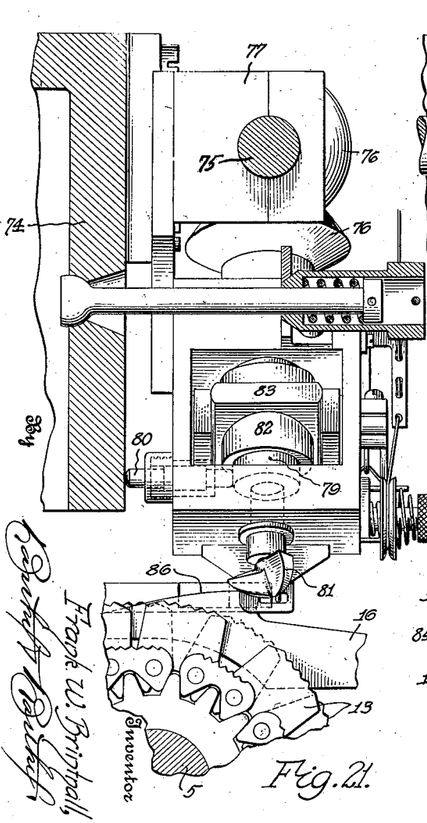
Fig. 21 an elevation of the left side thereof.

A device for holding and guiding the edges of the fabric is shown in detail in Figs. 17 and 18. This device is indicated, as a whole, by the numeral 87 and one of these devices is preferably located at each side of the run of the fabric A coming from the roll A'. One of these devices is also located at each edge of the run of the fabric B leaving the roll B', and the purpose of each device is to engage the fabric at its edge and guide the same against lateral movement, the operation of the device being controlled by its engagement with the edge of the fabric.

As shown in Figs. 17 and 18, this guiding device comprises a yoke 88 having a laterally extending stem 89 mounted within a suitable bearing located directly opposite the edge of the fabric to be guided, with the arms of the yoke extending at each side of the fabric and in a horizontal plane, the yoke having a slight rotative movement upon its stem 89. Within the yoke 88 is a second yoke 90 having the ends of its arms pivoted between the ends of the arms of the yoke 88 with said yoke 90 spanning the edge of the fabric.

Within the yoke 90 is a stud upon which is mounted a wheel 91 having pins 92 in its periphery to engage the edge portion of the fabric at one side and a similar stud is provided on the yoke, carrying a grooved wheel 93 to engage the opposite side of the fabric with the pins projecting through the fabric into the groove, said stud which carries the grooved wheel 93 being mounted upon a bracket 94 which is pivoted at 95 to the yoke 90. A spring 96 is interposed between the yoke 90 and the bracket 94 to turn said bracket upon its pivot and hold the grooved wheel in firm engagement with the edge of the fabric. A forked arm 97 is secured to the yoke 90 and extends laterally or downwardly therefrom with its forked end embracing the edge of the fabric, and a rod 98 on the yoke 90 extends laterally from one of its pivots in a direction opposite to that from which the body of the yoke extends, said rod being provided with an adjustable weight 99 adapted to counterbalance the weight of the forked arm 97 so that the swinging of the yoke 90 upon its pivotal support within the yoke 88 may be accurately regulated, so that the fork of the arm 97 will at all times engage the edge of the fabric.

Any tendency of the fabric A to run off from a true line laterally in either direction will be immediately counteracted by this holding device 87 for, referring particularly to Fig. 18, should the edge of the fabric A tend to move inwardly due to the wrinkling of the goods or from some other cause, the forked end of the arm 97 will follow this inward movement of the edge of the goods and in doing so will turn the yoke 90 within its supporting yoke and thus turn the wheels 91 and 93 out of parallelism with the edge of the goods or into a plane diverging from the plane of the edge of the goods in a direction rearwardly of the wheels and in the direction of the movement of the fabric. When thus turned the toothed wheel in engagement with the fabric will tend to travel inwardly or away from the edge of the goods, but being held against movement in that direction and the fabric traveling in the direction of the arrow in Fig. 18, this wheel will pull the fabric back to its straight path of travel and therefore each edge of the goods is held by the devices and constrained to travel in a direct line.

Motion is transmitted from any suitable source of power to drive the several moving parts of the machine, by mounting upon the frame 1 a short power shaft 100 from which motion is transmitted for driving the shaft 75 and operating the several sewing heads 73, by means of a sprocket chain 101 engaging sprocket wheels on said shafts. Motion is transmitted from the shaft 100 to drive the shaft 7, by means of beveled gears 102 and a worm and worm shaft 103. From the shaft 7 motion is transmitted to the shaft 5 by means of short driving chains 104, one located adjacent each end of the shaft within the supporting frame, these short chains also serving to engage the under side of the work and feed it from the machine. The rear shaft 6 is rotated by means of the several wide chains 10 which transmit motion from the shaft 7 to the shaft 6. Motion is also transmitted from the shaft 6 to the shaft 5 by means of the several narrow feed chains 9. A large gear 105 on one end of the shaft 7 is in engagement with a similar gear wheel 106 on the end of the shaft of the roll 69 to positively drive said roll and the belts 70. Motion is transmitted from the shaft 5 for driving the feed drum 47 by means of gears 107 on each end of the shaft 5 outside of its bearings, which gears engage similar gears 108 on short stub shafts 109 mounted in suitable bearings on the frame at each side of the machine. The gears 108 engage idlers 110 and these idlers transmit motion to large gears 111 secured to the ends of the drum shaft 47$^a$.

Motion for driving each of the side chains 19 is transmitted to the short vertical shafts 22 upon which the driving sprockets 21 are mounted, by means of a worm gear 112 on the shaft 109 in engagement with a like worm gear 113 on said shaft 22 and by properly proportioning the different gears the several parts of the entire machine are driven in the desired timed relation to the rotation of the power shaft 100. Obviously the power may be applied to any suitable part of the machine and power transmitted to the different shafts in any suitable manner.

A machine arranged and constructed generally as herein described is particularly adapted for feeding and simultaneously sewing long lengths of upholstery from which pieces of the desired length for use may be cut, the work being greatly facilitated by forming long strips of upholstery with a continuous movement through the machine. Shorter lengths may however be formed and other means may be devised for guiding and forming longitudinal fabric ribs on the lining and covering material prior to the sewing operation, it being one of the main objects of the present invention to provide means for supporting and feeding comparatively wide strips of material with an accurate guiding and holding of the material while it is being formed with the upstanding fabric ribs with fabric tubes between the ribs, and at the same time automatically filling these fabric tubes with a filling material.

While an actuated swinging-head carrying the sewing instrumentalities is desirable in some kinds of work, especially where very long stitches are desired, the claims are not to be understood as limited to such feature where a broader construction is permissible in view of the art.

Figures 7, 8, 9:
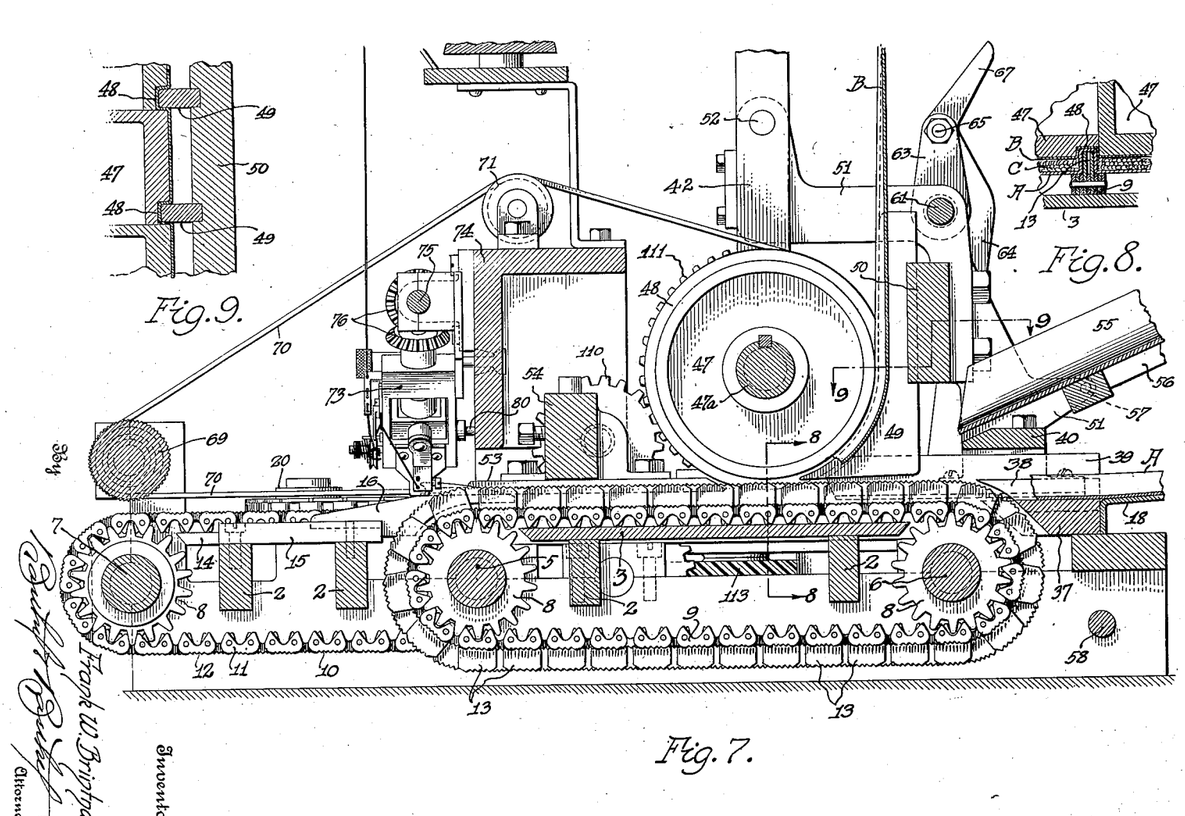
Fig. 7 is an enlarged longitudinal section substantially upon the line 7—7 of Fig. 4.
Fig. 8 is a sectional detail substantially upon the line 8—8 of Fig. 7.
Fig. 9 is a sectional detail substantially upon the line 9—9 of Fig. 7.
Figure 10:
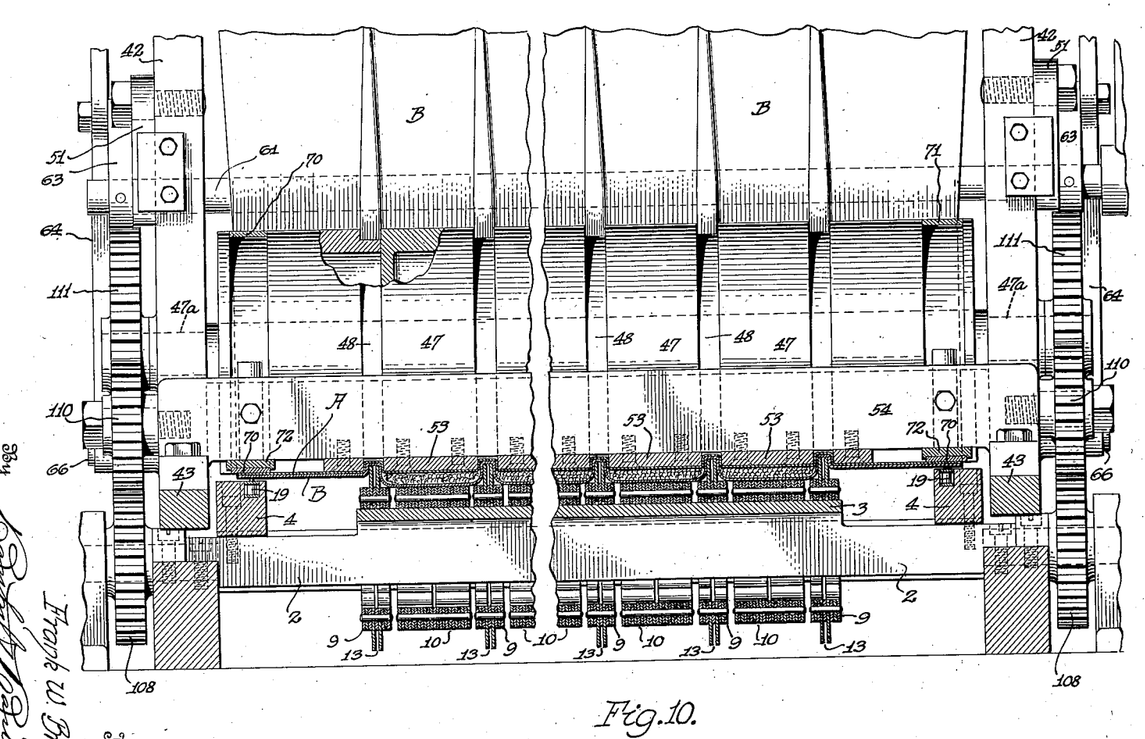
Fig. 10 is an enlarged transverse vertical section substantially upon the line 10—10 of Fig. 1 with portions broken away to reduce the size of the figure.

Highly important features of the invention are the grooved drum or forming-roll related to the ridge-chains 9 in the manner shown in Figs. 7 and 10; the seam-heightening blades, or fins, 16, related to the ridge-chains in the manner shown in Fig. 16; and the formers 39 which depress the fabric into the spaces intervening between the ribs 38 (and ridge-chains 39) to provide the fullness necessary to the pleat-formation, as shown in Fig. 11. It is important, also, to provide each fabric separately with U-shape seam-ridges which are brought into nested relation when the ridge-chains carry the seam-ridges of the lower fabric through the peripheral grooves 48 of the forming-roll 47 (compare Figs. 7–10). Obviously, the fabrics may be transposed, or interchanged, depending upon which fabric is employed to provide the fullness necessary to the pleat-formation.

In my co-pending application Serial No. 203,231, claims are presented for the sewing mechanism per se and in combination with certain elements, whereby pleated, unfilled upholstery may be formed, if desired.

Such changes as fall within the scope of the appended claims are contemplated and I do not, therefore, limit myself to the particular construction and arrangement shown. It is my intention to claim all of my invention, and the appended claims should be construed as broadly as permissible, in veiw of the prior art.

Having thus fully described my invention, what I claim is:—

1. In an upholstery forming machine, the combination of means for guiding a covering and a lining material to the machine, means for feeding and forming up said materials with longitudinal ribs and tubular portions between the ribs, said means including a rotatable drum having spaced-apart grooves therein and traveling longitudinal members extending beneath said drum and projecting into said grooves, means for introducing batts into said tubular portions, and means for sewing said ribs to provide longitudinal seams on the upholstery between the tubular portions thereof.

2. In an upholstery forming machine, the combination of means for guiding covering and lining materials, means for bringing said covering and lining materials together along longitudinal lines and forming up the same along said lines to provide ribs with tubular portions between the ribs, means for directing filling material into the open ends of the tubular portions between the covering and lining materials as they are brought together along the lines of said ribs, a series of traveling feed members to engage within the ribs of the materials and feed the materials forwardly, said members being arranged to withdraw from said ribs at a point of their travel, and means for sewing each of said ribs positioned adjacent to and forwardly of the point of withdrawal of the traveling feeding members from said ribs.

3. In an upholstery forming machine as characterized in claim 2 and including a series of feed chains to engage the work between said ribs, said chains being disposed between said traveling feeding means and extending beyond the forward end of said traveling feeding means.

4. In an upholstery forming machine, the combination of a rotatable drum having peripheral grooves therein, a series of traveling feed chains beneath said drum provided with upstanding members to engage within the grooves of the drum, means for directing covering and lining fabrics between said drum and chains, means for introducing batts between said fabrics and means for sewing the formed up ribs of the materials.

5. An upholstery forming machine as characterized in claim 4 having a series of ribs and a series of forming members between said ribs to form one fabric with upstanding rib portions and depressions between the ribs prior to the entry of said fabric between the drum and feed chains, and means for forming the other fabric into the drum grooves prior to its being brought into contact with the first mentioned fabric beneath said drum, and means for introducing batts between said fabrics.

6. In an unholstery forming machine, the combination of a table over which a covering material is directed in passing to the machine, a series of traveling feed chains in the plane of said table and forwardly thereof, a rotatable drum above and spaced from said feed chains, means for directing a lining material to and beneath said drum in an angular relation to the covering material on the table, means for forming up said materials with longitudinal ribs with the ribs on the covering material engaged within the ribs on the lining material, and with tubular portions between the ribs, means for directing filling material into the open ends of the tubular portions as the lining material is brought into contact with the covering material by said drum, and sewing means positioned forwardly of said drum for sewing said formed ribs transversely.

7. In upholstery forming machines wherein is provided a sewing mechanism and mechanism for forming covering and lining materials into parallel rows of tubes or pockets, and feeding mechanism for passing the materials through the machine; said forming mechanism including a grooved roller and endless chains associated with said roller, certain of said chains including links having portions to project into the grooves of said roller as the chains pass the roller and others of said chains serving as pleat-carrying chains.

8. In upholstery forming machines wherein is provided a sewing mechanism and mechanism for forming covering and lining materials into parallel rows of tubes or pockets, and feeding mechanism for passing the materials through the machine; said forming mechanism including a grooved roller and endless chains associated with said roller, certain of said chains including links having portions to project into the grooves of said roller as the chains pass the roller and others of said chains serving as pleat-carrying chains, and forming plates associated with said chains and roller to impart an initial form to the covering and lining materials before the same pass between said roller and said chains.

9. In upholstery forming machines wherein is provided a sewing mechanism and mechanism for forming covering and lining materials into parallel rows of tubes or pockets, and feeding mechanism for passing the materials through the machine; said forming mechanism including a grooved roller and endless chains associated with said roller, certain of said chains including links having portions to project into the grooves of said roller as the chains pass the roller, and forming plates associated with said chains and roller to impart an initial form to the covering and lining materials before the same pass between said roller and said chains, and means maintaining the initially formed covering and lining materials separated until they are about to pass between said roller and chains, and means to deliver a tube-filling material between the separated covering and lining materials as they pass between said roller and chains.

10. In upholstery forming machines, a forming roll; means for conveying covering and lining materials past said roll and in association therewith; a forming shoe associated with said roll to cooperate therewith and give the desired form to the lining material passing the roll; a stationary element and a movable element device to give form to the covering material as it passes to the roll; and means common to both said movable element and said shoe for simultaneously moving the same into and out of cooperation with the stationary element and roll respectively.

11. In upholstery forming machines, a forming roll; means for conveying covering and lining materials past said roll and in association therewith; a forming shoe associated with said roll to cooperate therewith and give the desired form to the lining material passing the roll; a stationary element and a movable element device to give form to the covering material as it passes to the roll; and means common to both said movable element and said shoe for simultaneously moving the same into and out of cooperation with the stationary element and roll respectively, and a feed chute for delivering tube-filling material between said covering and lining materials as they are brought into juxtaposition on passing the forming roll, and means mounting said chute in connection with said common means whereby movement of said common means will move said chute into and out of operative position accordingly as said shoe and said movable element are placed in an operative or non-operative position by said common means.

12. In upholstery forming machines, material feeding and rib forming mechanism which includes a movable rib producing duplex chain having laterally spaced links, combined with fixed forming plates to produce ribs of relatively wide-shallow form, and a fin or blade associated with and projecting between said spaced links to draw the ribs into a narrow-deep form, said material feeding mechanism including means for introducing filling material.

13. In upholstery forming machines, material feeding and rib forming mechanism which includes means for introducing batts and a movable rib-producing duplex chain having laterally spaced links, combined with fixed forming plates to produce ribs of relatively wide-shallow form, and a fin or blade associated with and projecting between said spaced links to draw the ribs into a narrow-deep form, combined with a sewing mechanism associated with said fin to sew the ribs.

14. In upholstery forming machines, means including traveling longitudinal feeding devices to form the material into ribs providing pleats therebetween, means to shape the ribs for sewing and for holding the ribs in shape while being sewed, means for introducing filling material, and means adapted to come into function as the material leaves the traveling longitudinal feeding device to sew the ribs to secure them in their final condition.

15. In combination in an upholstery machine: means for feeding fabrics and providing the same with nested seam-ridges, said means including means for forming fullness between the seam-ridges to provide pleats; converging longitudinally traveling means engaging the lateral margins of one of the fabrics and permitting controlled in-gathering of said fabric; means for introducing cotton batts between the fabrics as they pass through the machine; and sewing mechanisms, each comprising a head equipped with sewing instrumentalities, including a sewing-needle adapted to be thrust through and withdrawn from the seam.

16. A machine as specified in claim 15, in which separate devices are employed for forming the seam-ridges of the two fabrics, and in which the fabric-feeding devices serve to bring the pre-formed seam-ridges of the fabrics into nested relation before they reach the sewing mechanisms.

17. In combination in an upholstery machine: a frame equipped with a bed over which a fabric may be drawn, said bed being equipped with means upon which seam-ridges may be formed in said fabric; co-acting means disposed over said bed for forming said seam-ridges and providing fullness in the fabric between the seam-ridges; devices for supporting and conducting another fabric to a plane above the path of the first-mentioned fabric and separately pre-forming in said second-mentioned fabric seam-ridges which, after such pre-forming, receive the first-mentioned seam-ridges; means for introducing batts between the fabrics as they pass through the machine; and sewing mechanisms, each comprising a head equipped with sewing instrumentalities, including a sewing-needle adapted to be thrust through and withdrawn from the seam.

18. In combination in an upholstery machine: means for feeding fabrics and forming separately therein seam-ridges, said means including means for nesting the seam-ridges of one fabric after they have been formed within the seam-ridges of the other fabric after they have been formed; means for introducing batts between the fabrics in the spaces intervening between the seam-ridges of the fabrics; and sewing mechanisms disposed over the path of the fabrics, each comprising a head equipped with sewing instrumentalities, including a sewing-needle adapted to be thrust through and withdrawn from the seam.

19. A machine as specified in claim 18 having means disposed within the seam-ridges over which the seams ride to the stitching position after the seam-ridges have been brought into nested relation.

20. In combination in an upholstery machine: a bed equipped with traveling ridge-chains adapted to support a fabric; means disposed above said bed co-acting with said ridge-chains in the formation of seam-ridges in said fabric and intervening fullness to provide pleats; means disposed above said bed for directing batts to the pleats; a grooved forming-roll disposed above said bed and co-acting with said ridge-chains in front of the point where the batts are led to the pleats; means for conducting another fabric between the batts and forming-roll; means co-acting with the forming-roll in the formation of seam-ridges in the last-mentioned fabric; and sewing mechanism disposed in front of the forming-roll equipped with sewing-needles adapted to work through the nested seam-ridges.

21. A machine as specified in claim 20 in combination with means disposed in front of the sewing mechanisms adapted to aid in feeding the materials through the machine.

22. In combination in an upholstery machine: means for feeding fabrics and providing the same with nested seam-ridges, said means including ridge-chains and co-acting means for forming fullness between the ridge-chains to provide pleats; means for introducing batts between the fabrics as they pass through the machine; and sewing mechanisms, each comprising a head equipped with sewing instrumentalities, including a sewing-needle adapted to be thrust through and withdrawn from the seam.

23. In a machine as specified in claim 22, a grooved forming-roll co-acting with the ridge-chains.

24. In a machine as specified in claim 22, a grooved forming-roll co-acting with the ridge-chains, and blades co-acting with the ridge-chains over which blades the seams pass from the ridge-chains.

25. In an upholstery machine: means for producing ribs in the fabrics being operated on and bringing said ribs into nested relation, said means including ridge-chains serving in carrying one of the fabrics through the machine; means for conducting batts between the fabrics; devices extending within the fabric-ribs for stretching the ribs after they leave the ridge-chains; and means co-acting with said devices for sewing the fabric-ribs.

26. In an upholstery machine: means for feeding fabrics and forming seam-ridges in said fabrics and bringing them into nested relation; means for conducting batts between the fabrics; sewing mechansims for sewing the nested seam-ridges; and devices adapted to engage the edge-portions of a run of one of the fabrics leading from a supply of said material, each of such devices including a toothed wheel to engage an edge-portion of the fabric and pivotally mounted for swinging movement in a plane parallel with the plane of movement of said run, and means serving to engage the edge of the fabric for swinging said toothed wheel.

27. In an upholstery machine: a bed equipped with ridge-like devices over which seam-ridges may be formed in a fabric fed over said bed and co-acting means for forming upstanding seam-ridges and intervening pleat-forming fullnesses in said fabric; a forming-roll provided with grooves through which said seam-ridges pass; means above said bed for supplying a second fabric between said forming-roll and bed; means co-acting with said roll for forming upstanding seam-ridges in the second fabric which receive the seam-ridges of the first fabric; means for conducting batts to the pleats; and sewing mechanisms mounted above the path of the upholstery and serving to sew the nested upstanding seam-ridges.

28. Mechanism as specified in claim 27, characterized by blade-like guides over which the nested seam-ridges ride from the forming-roll to the sewing mechanisms.

29. In an upholstery machine: a grooved roll; means for forming seam-ridges in fabrics and feeding the fabrics to said grooved roll to nest the seam-ridges in the grooves thereof; a structure having grooves into which said nested ridges pass from the grooves of said roll; and means for sewing the nested seam-ridges after they pass from said structure.

30. In an upholstery machine; a grooved roll; and means co-operating with the roll for feeding fabrics along converging paths and forming nested seam-ridges therein, said means including fixed forming-shoes disposed between said fabrics and equipped with edges projecting into the grooves of said roll to guide the seam-ridges in one of said fabrics into said grooves.

31. In an upholstery machine; a grooved roll; sewing mechanism; mechanism for guiding fabrics to said roll and thence to said sewing mechanisms, the second-mentioned mechanism being adapted to form seam-ridges in said fabrics; and means functioning from a point in advance of said roll to adjacent said sewing mechanisms and co-operating with the grooves in said roll to nest the seam-ridges formed in one of said fabrics in the seam-ridges formed in the other of said fabrics, the last mentioned means having parts projecting into the grooves of said roll.

32. In combination in an upholstery machine: a frame equipped with a bed over which a fabric may be fed, said bed being equipped with means upon which seam-ridges and intervening pleat-fullnesses may be formed in said fabric; devices disposed above said bed for supporting and conducting a second fabric to a plane above the path of the first-mentioned fabric and pre-forming seam-ridges therein, said last-mentioned means serving to bring the pre-formed seam-ridges of said second fabric into position to receive therein, in nested relation, the seam-ridges of the first-mentioned fabric; means for introducing batts between the fabrics and into said pleat-fullnesses; and sewing mechanisms, each comprising a head equipped with sewing instrumentalities, including a sewing needle adapted to be thrust through and withdrawn from the seam.

33. A machine as specified in claim 32, in which the means for pre-forming the seam-ridges in the second fabric includes a moving device having recesses to permit the passage of the nested seam-ridges of the fabrics and having shoes co-acting with said recesses to pre-form the seam-ridges of the second fabric in readiness to receive the seam-ridges of the first mentioned fabric.

34. A machine as specified in claim 32, in which an endless conveyor device is employed to carry the first-mentioned fabric beneath and past the means which serves to pre-form the seam-ridges in the second fabric.

In testimony whereof I affix my signature.

FRANK W. BRINTNALL.